Jan. 24, 1956  A. H. HAVERLEE  2,732,158
SUPPORT-PENETRATING BRACKET
Filed Sept. 8, 1952  2 Sheets-Sheet 1

INVENTOR.
ARNOLD H. HAVERLEE
BY

Jan. 24, 1956 A. H. HAVERLEE 2,732,158
SUPPORT-PENETRATING BRACKET
Filed Sept. 8, 1952 2 Sheets-Sheet 2
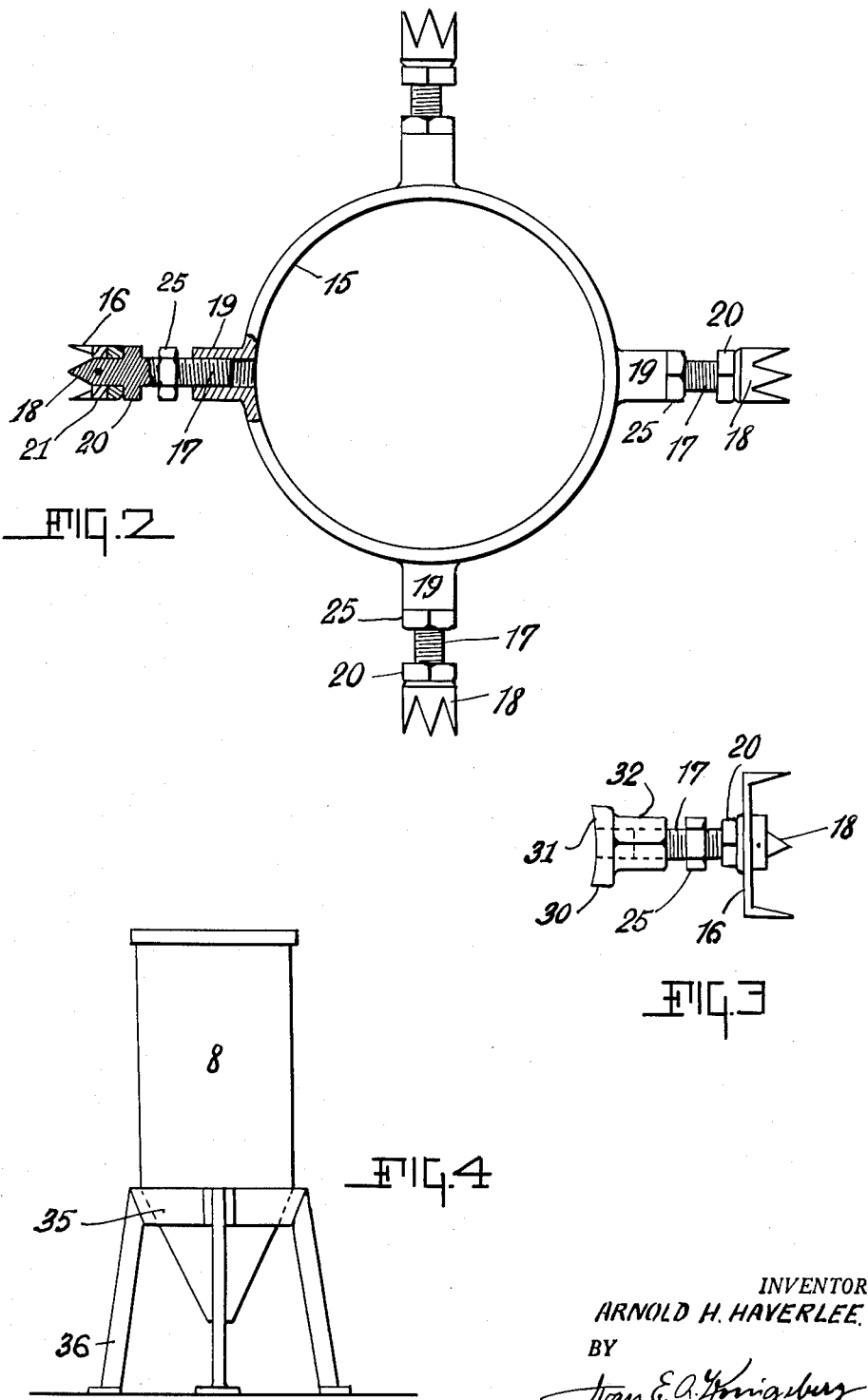
INVENTOR.
ARNOLD H. HAVERLEE.
BY United States Patent Office 2,732,158
Patented Jan. 24, 1956

2,732,158

SUPPORT-PENETRATING BRACKET

Arnold H. Haverlee, West Nyack, N. Y.

Application September 8, 1952, Serial No. 308,364

1 Claim. (Cl. 248—216)

The object of this invention is to provide a method and apparatus for treating sewage and water by the installation of chemical dosing tanks in sewerage systems, water wells and other suitable places. It has been found that sewage odors and undesirable bacteria may be eliminated and controlled by dosing the sewage with a suitable chemical, for example emulsified chlorinated benzene. In using this chemical, or other like means, it has heretofore been the practice to place a barrel in a sewer manhole and fill the barrel with the chemical and water. This manner of dosing the sewage is wasteful, unreliable and requires much manual labor in the opening of the manhole, carting of water and the like. Such method also lacks adjustable controlling means for regulating the flow of the chemical from the barrel and the method therefore involves frequent inspection.

In order to overcome these disadvantages and provide for more systematic operation and control of dosing sewage, this invention provides a system in which specially constructed gravity dosing tanks are installed in manholes, pump stations, water wells and other locations of control and sewage treatment.

More particularly, the object of this invention is to provide a specially constructed dosing tank and specially constructed supporting means for such tank for suspending the tank within a manhole above the flow line of the sewage. The tank is also provided with means for controlling the outflow of the chemical. The manhole cover is provided with a removable plug so that the tank may be replenished by a hose from a supply truck. Screening means are also provided to prevent dust and dirt from entering the tank. Very little manual labor is required for the installation of the tank and frequent inspection is avoided.

Accordingly, the invention is embodied in a gravity chemical dosing tank for sewerage systems together with novel supporting means for the tank as hereinafter set forth and as illustrated in the accompanying drawings in which—

Fig. 2 is a plan view of the novel supporting means with parts in section.

Figs. 3 and 4 show modifications.

Figure 1:
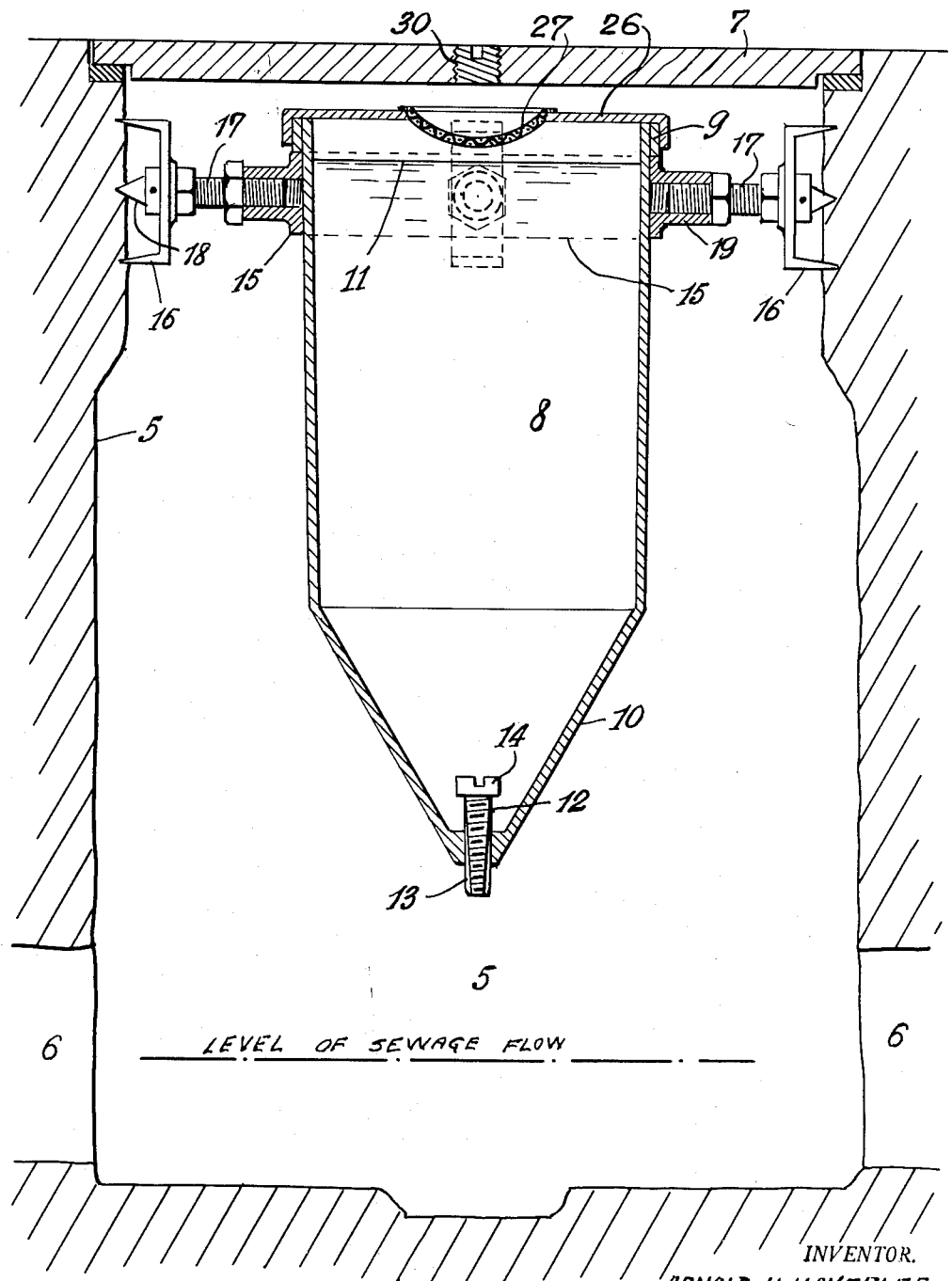
Fig. 1 is a sectional view of a manhole showing the dosing tank and its supporting means therein.

In Fig. 1, a manhole 5 is shown with two sewer lateral outlets 6, 6. The manhole cover is marked 7. A dosing tank is shown at 8. At the top, which is open, the tank is provided with a ring or flange 9. The bottom of the tank is preferably cone shaped as at 10 and is provided with a pet cock or other means for controlling and regulating the outflow of liquid from the tank. For this purpose a screwthreaded plug 12 may be used. The plug has inclined grooves 13 and a kerfed head 14 whereby to adjust the vertical position of the plug in the tank to graduate the outflow through the grooves 13. Other suitable means for this purpose may be used. The plug 12 has the advantage that the head may be reached by a long handled screwdriver for operation. The amount of outflow of the liquid from the dosing tank will be determined by experience and the local conditions.

The tank is suspended in the manhole in that it rests within and upon a ring bracket 15 by means of the aforesaid flange 9. The ring bracket is clamped in the manhole by means of toothed jaws 16 carried by screw bolts 17 which end in sharp points 18. The jaws 16 and the points 18 are adapted to be forced into the brick lining of the manhole so as to jam the ring bracket in tank holding position as shown.

The ring bracket is shown in Fig. 2 as having a number, in this case four, internally threaded bearings 19 in which the screw bolts 17 are screwed inward or outward to cause the jaws and the sharp points to forcibly enter and be seated in the brick work as will be understood. As shown in Fig. 2, the screw bolt has a square or hexagonal integral head 20 for turning the bolt with a wrench and the jaws 16 are preferably freely rotatably carried by the bolt so that the jaws may adjust themselves to the irregularities or cemented portions of the manhole lining for better gripping adjustment. A collar 21 is pinned to the bolt to keep the jaw heads thereon. The bolts are locked in position by locknuts 25.

When the ring bracket has been firmly anchored within the manhole, the tank is lowered through the bracket and comes to rest as stated above. Then the chemical liquid may be poured into the tank and a loose cover placed over the tank. The cover is marked 26 and may have a screen 27 to prevent dirt from entering the tank. The screen is detachable for cleaning. The manhole cover is provided with a screw threaded plug 30 so that when the tank is to be replenished it is not necessary to remove the manhole cover, but the tank may be filled by a hose from a supply truck. Thus much labor will be saved.

A modified support for the tank is shown in Fig. 3. Instead of being part of the ring bracket, each screw bolt carries a threaded head 30 having a curved surface 31. In this case, the tank is held suspended at the proper level and by applying three or more of the supports shown in Fig. 3 between the outside of the tank and the manhole lining, the jaws 16 and points 18 may be forcibly seated in the lining while the heads 30 are jammed against the side of the tank by operation of the screw bolts 17. This device may be found useful in perhaps smaller size manholes or where for other reasons the ring bracket 15 cannot be used. The heads 30 are preferably squared as at 32 so they can be held in the proper position against the tank under the flange 9 thereon.

In certain other places, as for example in water wells, the dosing tank may be supported by a framework 35 having feet 36 as shown in Fig. 4. The dosing tank in the latter figure is the same as the tank shown in Fig. 1.

The dosing tanks are placed in sewer systems at critical locations after a survey. The supporting brackets or devices provide detachable, easily operated, supporting means for the tank depending upon the condition of the situ of location. The tank is preferably suspended above the flow line of the sewerage system so that the laterals are partially disinfected while the sewage in the main lines receives the treatment.

The tanks may be made of any suitable material and in any convenient size. The outflow may be regulated as stated above. The tanks function automatically and daily inspection is not necessary.

I claim:

In a device for disinfecting a sewer system by a gravity disinfecting dosing tank supported within a manhole in the system above the flow line of the sewage therein, said tank having an open top surrounded by a flange secured to the tank, means for supporting said dosing tank within a manhole comprising a ring formed member adapted to enclose and support the tank by engaging the same beneath the said flange thereon, a plurality of extensible circumferentially and uniformly spaced members carried by said ring formed tank support and extending outwardly therefrom, each of said extensible members consisting of a screw bolt, jaw means carried on the outer end of each of said bolts in freely rotatable relation thereto, a threaded bearing on said ring formed member for each of said extensible members for supporting said screw bolt in threaded engagement therewith, a squared portion on the screw bolt for rotating the same to cause said jaw means to forcibly engage the wall of the manhole to firmly brace the said ring formed tank supporting member within the manhole, a lock nut for locking each of the extended bolts in position between its said threaded bearing and the wall of the manhole, said bolts having pointed ends to engage the wall of the manhole and in alinement with the said jaw means to cooperate therewith.

References Cited in the file of this patent

UNITED STATES PATENTS

| | | |
|---|---|---|
| 457,436 | Hays | Aug. 11, 1891 |
| 525,232 | Reese et al. | Aug. 28, 1894 |
| 530,816 | Wright | Dec. 11, 1894 |
| 891,897 | Astrom | June 30, 1908 |
| 909,808 | Laughterback | Jan. 12, 1909 |
| 1,005,371 | Union | Oct. 10, 1911 |
| 1,120,509 | Kunkle | Dec. 8, 1914 |
| 1,222,756 | Griner | Apr. 17, 1917 |
| 1,891,588 | Claus | Dec. 20, 1932 |
| 1,928,483 | Gerome | Sept. 26, 1933 |
| 1,951,660 | Klaudt | Mar. 20, 1934 |
| 2,372,544 | Borman et al. | Mar. 27, 1945 |
| 2,584,022 | Johnson | Jan. 29, 1952 |